*Van Velthoven & Hazzard.*
*Photographic Album.*

Nº 50521.    Patented Oct. 17, 1865.

Witnesses:
Wm Albert Steel.
John Parker.

Inventors.
R. Van Velthoven
J. H. Hazzard
By their Atty
H. Howson

UNITED STATES PATENT OFFICE.

RICHARD VAN VELTHOVEN AND JOSEPH H. HAZZARD, OF PHILADELPHIA, PENNSYLVANIA.

IMPROVEMENT IN PHOTOGRAPHIC ALBUMS.

Specification forming part of Letters Patent No. 50,521, dated October 17, 1865.

*To all whom it may concern:*

Be it known that we, R. VAN VELTHOVEN and J. H. HAZZARD, of Philadelphia, Pennsylvania, have invented an Improvement in Photographic Albums and other Books; and we do hereby declare the following to be a full, clear, and exact description of the same, reference being had to the accompanying drawings, and to the letters of reference marked thereon.

Our invention consists in certain flexible strips formed and combined with the leaves of an album or other book, substantially as described hereinafter, so that the said leaves shall be firmly bound together.

In order to enable others skilled in the art to apply our invention, we will now proceed to describe the manner of carrying it into effect.

Figure 6:
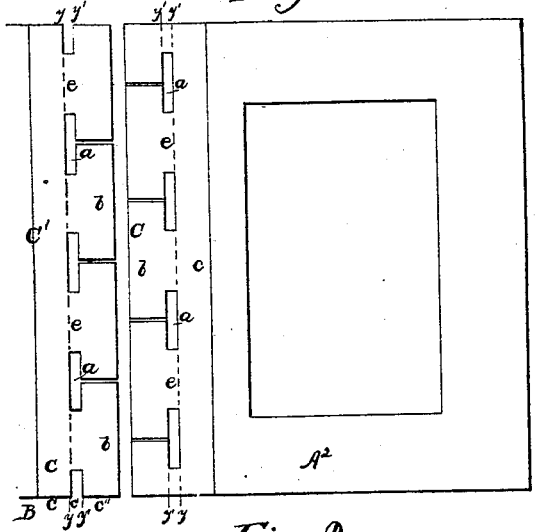
Figure 1:
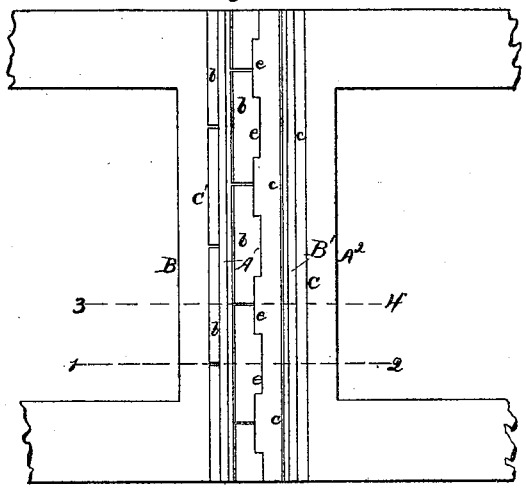
Figure 2:
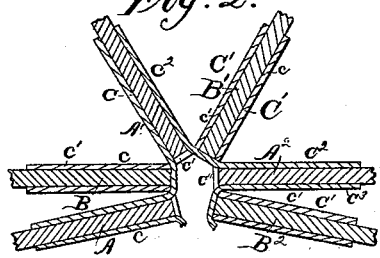
Figure 3:
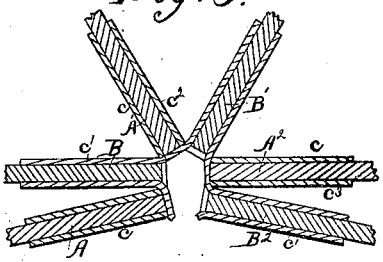
Figure 5:
Figure 4:
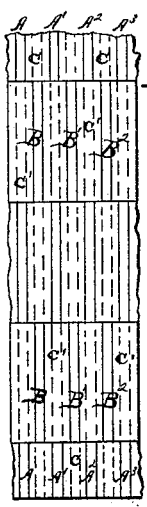
Figure 7:
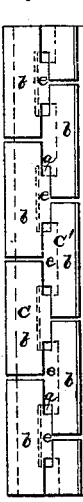

On reference to the accompanying drawings, which form a part of this specification, Figure 1 represents a number of leaves of a photographic album secured together according to our improvement; Fig. 2, a section on the line 1 2, Fig. 1; Fig. 3, a section on the line 3 4, Fig. 1; Fig. 4, a view, looking at the back of the book; Fig. 5, an edge view of part of the book; Fig. 6, view representing two of the leaves disconnected from each other; Fig. 7, a view showing the manner in which the strips for securing the leaves together are combined, and Fig. 8 one of the strips.

Similar letters refer to similar parts throughout the several views.

A, A', A², B, B', and B² are leaves of a photographic album, and to the inner edges of each of the leaves A, A', and A³ on one side of the same, is pasted or otherwise secured a strip, C, of parchment or other material, a portion of this strip projecting beyond the edge of the leaf, passing across the inner edge of the adjacent leaf, B, B', or B², and being pasted to the opposite side of the next leaf, A, A', or A², as best shown in Fig. 2.

Figure 8:
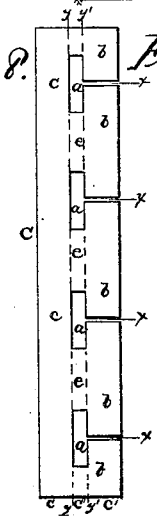

Each strip C may be divided into three parts, $c$, $c'$, and $c''$. The portion $c$, from one edge of the line $y$, Fig. 8, is secured to the edge of one leaf, A, the portion $c'$, between the line $y'$ and the opposite edge of the strip is secured to the edge of another leaf, and the central portion, $c''$, between the lines $y\ y'$, passes across the edge of the intermediate leaf, as above described.

In the center of the strip C, between the lines $y\ y'$, are a number of slots, $a\ a$, and the portion $c'$ of the strip is cut along the lines $x$, so as to form a number of T-shaped tongues or projections, $b$, which are connected with the plain portion $c$ of the strip only by the necks $e$, which are equal in length to the slots or openings $a$. The leaves B, B', and B² are connected together in a similar manner by somewhat similar strips, C', the form of which is best shown in Fig. 6. It will be seen, however, that while the tongues $b$ at each end of the strips C are incomplete, being, in fact, of an L shape, as shown in Figs. 6 and 8, the tongues $b$ in the strips C' are all perfect, the two strips being so formed that when placed side by side, as shown in Fig. 6, the necks $e$ of the tongues in one strip will be opposite the the slots $a$ in the other strip.

When a number of leaves are to be bound together the leaves A, A', and A² are connected to each other in the manner described, and as shown in Fig. 2. The portion $c$ of one of the strips C' is then secured to one edge of the leaf B, Fig. 2, and the latter is introduced between the leaves A and A', the tongues $b$ of the strip C' being so folded up that each may pass readily through one of the openings $a$ in the strip C, secured to the leaves A and A', and also through the openings $a$ in the strip C, (marked C²,) secured to the leaves A' and A². The ends of the tongues $b$, which project beyond the strip C², and which form the portion $c'$ of the strip C', are then unfolded and pasted to the side of a leaf, B', which is introduced between the leaves A' and A². To the opposite side of the leaf B' is secured another strip, C', and the tongues $b$, projecting from the edge of this strip, are then passed through the openings $a$ in the strips C, (marked C² and C³,) secured to the leaves A' and A², and the portions of these tongues projecting through the strip C² are secured to the side of the next leaf, B², additional leaves being secured in a similar manner to those thus bound together until a book of the size required is made. By this means the leaves are bound so firmly together that the edges of the same always coincide, the leaves being prevented from sliding across each other, as is the case when heavy boards or leaves are bound together in the usual manner. While the leaves are thus firmly bound together they will open readily, and when opened will lie perfectly flat, without that tendency of the central leaves to assume an upright position, which is so usual and objectionable in books bound in the ordinary manner.

Although we have only referred to the leaves of photographic albums as being bound in this manner, it will be apparent that this invention may be used in securing together the heavy boards of which books are formed for exhibiting patterns of fabrics, and for other similar purposes.

Without confining ourselves to the precise form herein described of the strips C C', or to any particular manner of attaching them to the leaves, or to any particular material for making the same—

We claim as our invention and desire to secure by Letters Patent—

The strips C C', of any suitable material, formed substantially as herein described, and combined with the leaves of an album or other book, substantially as and for the purpose set forth.

In testimony whereof we have signed our names to this specification in the presence of two subscribing witnesses.

RICHARD VAN VELTHOVEN.
JOSEPH H. HAZZARD.

Witnesses:
CHARLES E. FOSTER,
JOHN WHITE.